United States Patent
Iyoda

[11] Patent Number: 5,899,946
[45] Date of Patent: May 4, 1999

[54] APPARATUS FOR AND METHOD OF CONTROLLING ACTIVATION OF PASSIVE RESTRAINT AND APPARATUS FOR DETERMINING AMOUNT OF DEFORMATION OF VEHICLE

[75] Inventor: Motomi Iyoda, Seto, Japan

[73] Assignee: Toyota Jidosha Kabushiki Kaisha, Toyota, Japan

[21] Appl. No.: 08/726,453

[22] Filed: Oct. 4, 1996

[30] Foreign Application Priority Data

Oct. 6, 1995 [JP] Japan .................................. 7-286882

[51] Int. Cl.$^6$ .............................. G06F 17/00; G06F 7/00
[52] U.S. Cl. ................................ 701/20; 701/45; 701/46; 280/734; 180/274; 340/436
[58] Field of Search .................... 701/45, 46, 20; 280/734, 735; 340/436; 180/274, 282

[56] References Cited

U.S. PATENT DOCUMENTS

| | | | |
|---|---|---|---|
| 5,216,607 | 6/1993 | Diller et al. | 701/45 |
| 5,262,949 | 11/1993 | Okano et al. | 701/46 |
| 5,483,449 | 1/1996 | Caruso et al. | 701/46 |
| 5,530,649 | 6/1996 | Fujishima | 701/46 |
| 5,541,842 | 7/1996 | Gioutsos et al. | 701/45 |
| 5,559,697 | 9/1996 | Wang | 701/45 |
| 5,610,817 | 3/1997 | Mahon et al. | 701/46 |

FOREIGN PATENT DOCUMENTS 6-107113  4/1994  Japan .

Primary Examiner—William A. Cuchlinski, Jr.
Assistant Examiner—Gertrude Arthur
Attorney, Agent, or Firm—Kenyon & Kenyon

[57] ABSTRACT

A retardation sensor (20) measures a retardation applied to a vehicle in its longitudinal direction. A speed sensor (28) measures a ground speed of the vehicle at a time point when the retardation exceeds a specified reference retardation. A timer (32) measures a lapse of time period after the time point when the retardation exceeds the reference retardation. A CPU (40) included in a control circuit (30) calculates an amount of deformation of the vehicle from a difference between a value obtained by multiplying the retardation by the ground speed and a value obtained by integrating the retardation twice over the lapse of time period. The CPU (40) then compares the amount of deformation with a preset threshold value. When the amount of deformation exceeds the preset threshold value, the CPU (40) outputs an activation signal to a driving circuit (34), which supplies electricity to a squib (38) in an air bag unit (36) to ignite a gas-generating agent with the squib (38) in response to the activation signal. An activation control apparatus of the invention including the above constituents can determine whether a passive restraint, such as the air bag unit (36), is to be activated without using another operation value and effectively activate the passive restraint at an appropriate timing even when the vehicle crashes into a pole or in an under-ride collision.

8 Claims, 11 Drawing Sheets

APPARATUS FOR AND METHOD OF CONTROLLING ACTIVATION OF PASSIVE RESTRAINT AND APPARATUS FOR DETERMINING AMOUNT OF DEFORMATION OF VEHICLE

BACKGROUND OF THE INVENTION

1. Field of the Invention

The present invention relates to a passive restraint, such as an air bag unit, used for protecting a driver and passengers in a vehicle when the vehicle crashes. More specifically, the invention pertains to an apparatus for controlling activation of such a passive restraint as well as to a method of the same. The present invention further relates to an apparatus for determining an amount of deformation of a vehicle, which crashes into a collision object.

2. Description of the Prior Art

One example of known apparatuses for controlling activation of a passive restraint is one for controlling ignition of a squib included in an air bag unit. In the air bag unit, a gas-generating agent is ignited with a squib in an inflator to evolve a gas from the inflator and inflate a bag with the gas, in order to protect a driver and passengers from the impact of collision.

Conventional apparatuses for controlling ignition of a squib in such an air bag unit are generally provided with a retardation sensor (hereinafter may be referred to as G sensor) for measuring a retardation applied to a vehicle (especially, a retardation in a longitudinal direction of a vehicle). Ignition control is carried out according to the retardation measured by the G sensor. Proposed ignition control processes based on the retardation include a method using the value of retardation itself, another method using the integral value obtained by integrating the retardation once, and still another method using the second integral value obtained by integrating the retardation twice.

The method of controlling ignition based on the second integral value of the retardation (herein "the second integral value of the retardation" means "the double integral value of the retardation") is, for example, disclosed in JAPANESE PATENT LAID-OPEN GAZETTE No. 6-107113. The proposed method determines an ignition timing of a squib based on the second integral value of the retardation.

The second integral value obtained by integrating the retardation twice over time generally represents the amount of displacement of a non-fixed object in a vehicle relative to the vehicle. By way of example, when an excess retardation is applied to the vehicle in its longitudinal direction, a driver and other passengers in the vehicle are pulled and moved forward by the force of inertia. The second integral value corresponds to a relative distance by which the driver or the passenger moves relative to the vehicle upon impact. The proposed method accordingly compares the second integral value of the retardation with an appropriate threshold value. When the second integral value exceeds the threshold value, the gas-generating agent in the air bag unit is ignited with the squib. The conventional method using the second integral value of the retardation representing the relative distance by which the driver or the passenger moves determines an ignition timing of the squib by taking into account the relative distance and the expanded volume of the bag.

In air bag units, it is extremely important to determine whether the bag is to be opened or not (that is, whether the gas-generating agent is to be ignited with the squib or not) according to the driving condition of the vehicle. The proposed method using the second integral value of the retardation, however, may not adequately determine whether the gas-generating agent is to be ignited with the squib or not, while determining the appropriate ignition timing of the squib as discussed below.

FIGS. 10(a) through 10(c) are characteristic charts showing the retardation G measured by a G sensor as well as the integral value v and the second integral value S of the retardation G, which are all plotted against the time, upon collision of a vehicle. FIGS. 10(a), 10(b), and 10(c) respectively show the time-based variations in retardation G, integral value v of the retardation G, and second integral value S of the retardation G. The origin of the time scale 't' is located at a time point when the vehicle crashes into the collision object.

Upon collision of the vehicle, the second integral value S of the retardation G draws a time-based characteristic curve, which is substantially approximated by a quadratic function starting from the origin, as shown in FIG. 10(c). When the time 't' is infinity, the second integral value also becomes infinity. No matter what threshold value is set for the second integral value S, the second integral value S certainly exceeds the threshold value after a lapse of time period. Even if it has been set to prohibit ignition of the gas-generating agent with the squib when the second integral value S is equal to or less than an appropriate threshold value, since the second integral value S exceeds the threshold value in due course, it is rather difficult to appropriately determine whether the gas-generating agent is to be ignited with the squib or not (that is, whether the bag is to be opened or not) using only the second integral value S.

The conventional method accordingly requires a different operation value other than the second integral value of the retardation for determining whether ignition is to be carried out or not.

Upon collision of the vehicle, unlike the second integral value S, the retardation G does not increase infinitely but is limited to be not greater than a specified value, although significantly varying as shown in FIG. 10(a). Among the known processes for controlling ignition of the squib, the method using the retardation G itself can thus determine whether ignition is to be carried out or not (that is, whether the bag is to be opened or not).

There are, however, some cases of collision, in which the method using the retardation G only can not effectively determine the ignition timing of the squib.

FIGS. 11(a) through 11(c) illustrate the concept of a pole crash and an under-ride collision of a vehicle as well as a time-based variation in retardation G of the vehicle upon collision of the vehicle. FIG. 11(a) shows a case in which a front part of a vehicle 100 crashes into a pole, such as a utility pole 102; FIG. 11(b) shows a case of an under-ride collision in which the front part of the vehicle 100 crashes into, for example, a heavy-duty truck 104; and FIG. 11(c) shows the retardation G plotted against the time in the pole crash or in the under-ride collision.

Referring to FIGS. 11(a) and 11(b), when the vehicle 100 collides in the pole crash or in the under-ride crash, the collision object (that is, the utility pole 102 or the heavy-duty truck 104) does not collide with the framework of the body of the vehicle 100 but with a relatively soft part of the body. This causes the body to be deformed to a greater depth after the front part of the vehicle 100 crashes into the collision object. The characteristic curve of the retardation G of the vehicle 100, however, does not rise immediately as shown in FIG. 11(c). The characteristic curve of the retardation G rises at last when the body is deformed to a greater extent and the collision object collides with a relatively hard part, such as an engine.

Even when an appropriate threshold value is set for the retardation G to ignite the gas-generating agent with the squib at an appropriate timing, the conventional method using only the retardation itself to control the ignition can not effectively determine the ignition timing of the squib since the retardation G does not rise nor exceed the threshold value after a lapse of some time period as shown in FIG. 11(c) in case of pole crash shown in FIG. 11(a) or under-ride collision shown in FIG. 11(b). The same problem arises when the integral value v obtained by integrating the retardation once is used to control the ignition.

SUMMARY OF THE INVENTION

The object of the present invention is thus to provide an activation control apparatus which can determine whether a passive restraint, such as an air bag unit, is to be activated without using another operation value and effectively activate the passive restraint at an appropriate timing even when the vehicle crashes into a pole or in an under-ride collision.

At least part of the above and the other related objects is realized by a first activation control apparatus for controlling activation of a passive restraint mounted on a vehicle when the vehicle crashes into a collision object. The first activation control apparatus of the present invention includes: amount-of-deformation determining means for determining an amount of deformation of the vehicle based on a state of said vehicle, which crashes into the collision object; and activation means for activating the passive restraint when the amount of deformation determined by the amount-of-deformation determining means exceeds a specified threshold value.

Unlike the second integral value of the retardation, the amount of deformation of the vehicle does not increase infinitely but is limited to be not greater than a specified value. Even when a relatively soft part of the vehicle crashes into the collision object, the vehicle is remarkably deformed, so that a time-based characteristic curve of the amount of deformation of the vehicle rises immediately.

The first activation control apparatus of the present invention can determine whether the passive restraint is to be activated using only the amount of deformation of the vehicle. In the structure of the first activation control apparatus, an appropriate threshold value is set to be compared with the amount of deformation. This enables the amount of deformation to quickly rise and exceed the threshold value in an early stage when the vehicle crashes into a pole or in an under-ride collision, thereby effectively determining an activation timing of the passive restraint. This structure uses the amount of deformation of the vehicle in order to control activation of the passive restraint according to the damage of the body which the vehicle sustains upon collision.

In the description of the first activation control apparatus as well as the following description, the expression 'when A exceeds B' includes not only an instant at which A becomes greater than B but a time point after a specified time period elapsing from the instant.

In accordance with one aspect of the invention, the amount-of-deformation determining means further comprises: means for measuring an amount of displacement of the vehicle relative to the collision object after a time point when a retardation of the vehicle exceeds a specified reference retardation and specifying the amount of displacement as the amount of deformation.

After crashing into the collision object, the vehicle moves toward the collision object while making, for example, the front part of the vehicle deformed due to the collision with the collision object. The amount of displacement of the vehicle relative to the collision object is thus equivalent to the amount of deformation of the vehicle. This structure can accordingly exert the same effects as those described above by using the amount of displacement of the vehicle relative to the collision object as the amount of deformation of the vehicle.

In accordance with another aspect of the invention, the amount-of-deformation determining means further comprises: means for integrating a difference between a relative speed of a non-fixed object supposed to be in the vehicle to the collision object and a relative speed of the non-fixed object to the vehicle, over a lapse of time period after a time point when a retardation of the vehicle exceeds a specified reference retardation, so as to determine the amount of deformation.

The difference between the relative speed of the non-fixed object supposed to be in the vehicle to the collision object and the relative speed of the non-fixed object to the vehicle corresponds to the relative speed of the vehicle to the collision object. Integration of the difference over the lapse of time period yields the amount of displacement of the vehicle relative to the collision object as discussed above. This structure can thus exert the same effects as those described above by using the value obtained by integrating the difference as the amount of deformation of the vehicle.

The present invention is also directed to a method of activating a passive restraint mounted on a vehicle when the vehicle crashes into a collision object. The method of the present invention includes the steps of:

(a) determining an amount of deformation of the vehicle based on a state of said vehicle, which crashes into the collision object; and (b) activating the passive restraint when the amount of deformation determined in the step (a) exceeds a specified threshold value.

Unlike the second integral value of the retardation, the amount of deformation of the vehicle does not increase infinitely but is limited to be not greater than a specified value. Even when a relatively soft part of the vehicle crashes into the collision object, the vehicle is remarkably deformed, so that a time-based characteristic curve of the amount of deformation of the vehicle rises immediately.

The method of the present invention can determine whether the passive restraint is to be activated using only the amount of deformation of the vehicle. The method enables the amount of deformation to quickly rise and exceed the threshold value in an early stage even when the vehicle crashes into a pole or in an under-ride collision, thereby effectively determining an activation timing of the passive restraint The present invention further provides a first apparatus for determining an amount of deformation of a vehicle, which crashes into a collision object. The first apparatus comprises: retardation measuring means for measuring a retardation of the vehicle; and amount-of-deformation calculating means for calculating the amount of deformation from the retardation measured by the retardation measuring means.

In accordance with another preferable application, the present invention is further directed to a second apparatus for determining an amount of deformation of a vehicle, which crashes into a collision object. The second apparatus comprises: speed measuring means for measuring a speed of the vehicle; and amount-of-deformation calculating means for calculating the amount of deformation from the speed measured by the speed measuring means.

In accordance with still another preferable application, the present invention provides a third apparatus for determining an amount of deformation of a vehicle, which crashes into a collision object. The third apparatus comprises: means for measuring an amount of displacement of the vehicle relative to the collision object after a time point when a retardation of the vehicle exceeds a specified reference retardation and specifying the amount of displacement as the amount of deformation.

In accordance with another preferable application, the present invention is directed to a fourth apparatus for determining an amount of deformation of a vehicle, which crashes into a collision object. The fourth apparatus comprises: means for integrating a relative speed of the vehicle to the collision object over a lapse of time period after a time point when a retardation of the vehicle exceeds a specified reference retardation, so as to determine the amount of deformation.

In accordance with still another preferable application, the present invention provides a fifth apparatus for determining an amount of deformation of a vehicle, which crashes into a collision object. The fifth apparatus comprises: means for integrating a difference between a relative speed of a non-fixed object supposed to be in the vehicle to the collision object and a relative speed of the non-fixed object to the vehicle, over a lapse of time period after a time point when a retardation of the vehicle exceeds a specified reference retardation, so as to determine the amount of deformation.

The first through the fifth apparatuses of the present invention are constructed by separating the part for determining the amount of deformation of the vehicle from the activation control apparatus described above. The amount of deformation measured by the apparatus of this separate structure can be used for any purposes other than for controlling activation of the passive restraint.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
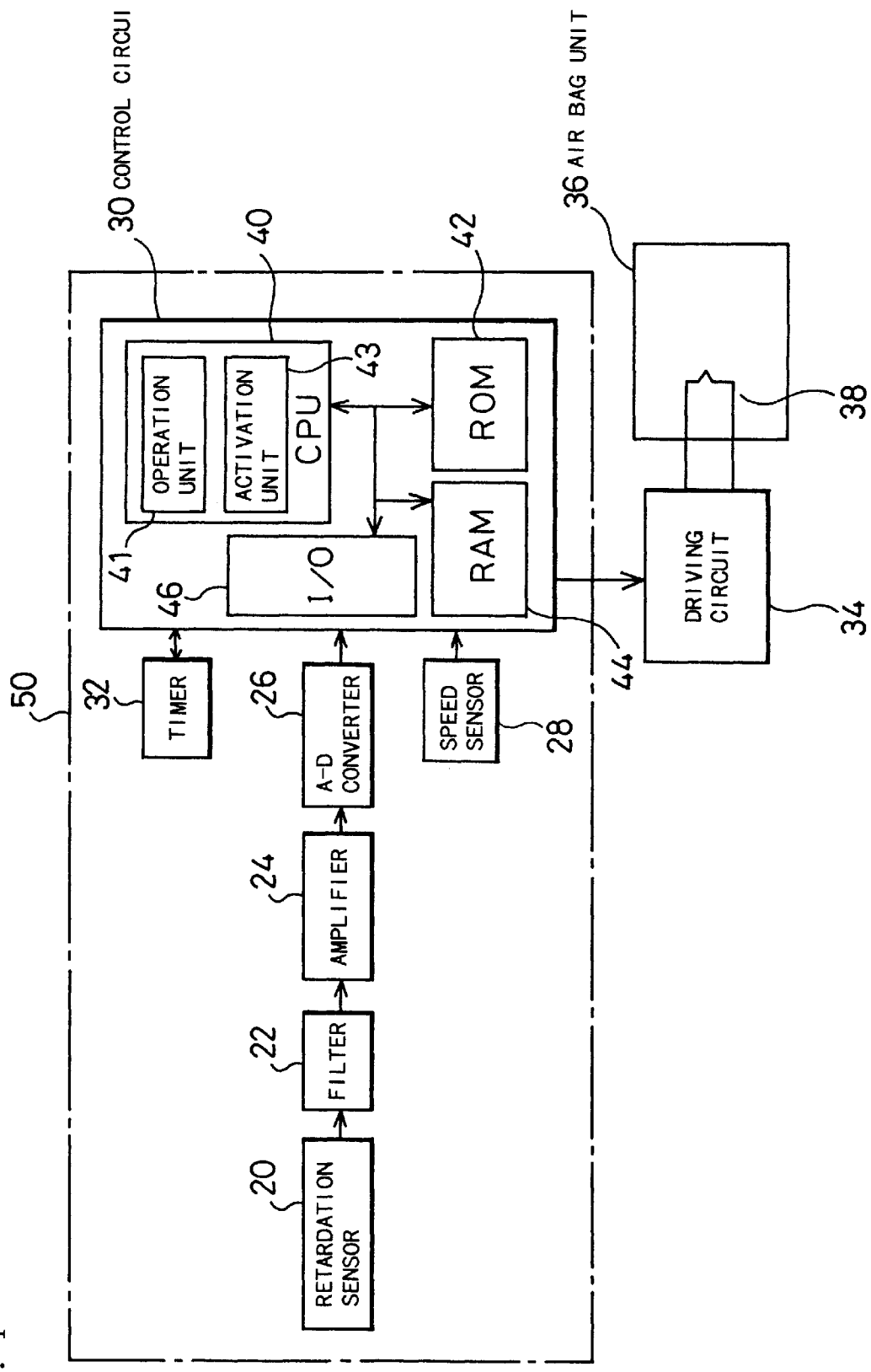
FIG. 1 is a block diagram illustrating structure of an activation control apparatus 50 as a first embodiment according to the present invention.

FIG. 1 is a block diagram illustrating structure of an activation control apparatus 50 as a first embodiment according to the present invention. Referring to FIG. 1, the activation control apparatus 50 of the embodiment includes a retardation sensor 20, a speed sensor 28, a timer 32, and a control circuit 30 as primary elements. The activation control apparatus 50 is connected with an air bag unit 36 via a driving circuit 34. These constituents are respectively mounted at predetermined positions on a vehicle (not shown).

The retardation sensor 20 measures a retardation (hereinafter "retardation" means "deceleration" applied to the vehicle in its longitudinal direction and outputs the measured retardation as an analog electric signal. The retardation sensor 20 may be either a sensor for measuring only the retardation or a sensor for measuring the acceleration in a wide sense, that includes the retardation.

The electric signal output from the retardation sensor 20 is supplied to a filter 22, which eliminates a noise component from the received electric signal. The filtered electric signal is then amplified in an amplifier 24, converted from the analog signal to a digital signal by an analog-to-digital converter 26, and received by the control circuit 30. When the retardation sensor 20 outputs digital signals, the filter 22, the amplifier 24, and the analog-to-digital converter 26 can be omitted from the structure.

The speed sensor 28, on the other hand, measures a speed of a vehicle (ground speed) and outputs the measured speed as a digital electric signal to the control circuit 30. A sensor for outputting analog electric signals may be used for the speed sensor 28. The structure may not include the speed sensor 28, but reads a value obtained by a speedometer (not shown) and outputs the input value to the control circuit 30.

The timer 32 measures a time period elapsing from a specified time point and outputs the measured time period as a digital electric signal to the control circuit 30.

The control circuit 30 includes a central processing unit (CPU) 40, a read only memory (ROM) 42, a random access memory (RAM) 44, and an input/output circuit 46. These constituents are connected to one another via a bus. The CPU 40 carries out a variety of processes of activation control according to programs stored in the ROM 42. The RAM 44 stores a variety of data transmitted from the respective sensors 20 and 28 and the timer 32 as well as results of operations executed by the CPU 40 based on such data. The input/output circuit 46 receives the variety of data transmitted from the respective sensors 20 and 28 and the timer 32 and outputs an activation signal to the driving circuit 34.

The CPU 40 further includes an operation unit 41 for computing an amount of deformation of the vehicle according to the programs stored in the ROM 42 as discussed later and an activation unit 43 for activating the air bag unit 36 based on the amount of deformation thus computed.

The air bag unit 36 includes a squib 38 functioning as an igniter, a gas-generating agent (not shown) ignited with the squib 38 to evolve a gas, and a bag (not shown) inflated with the gas evolved. The driving circuit 34 supplies electricity to the squib 38 in the air bag unit 36 so as to ignite the gas-generating agent with the squib 38 in response to an activation signal output from the activation control apparatus 50.

Figure 2:
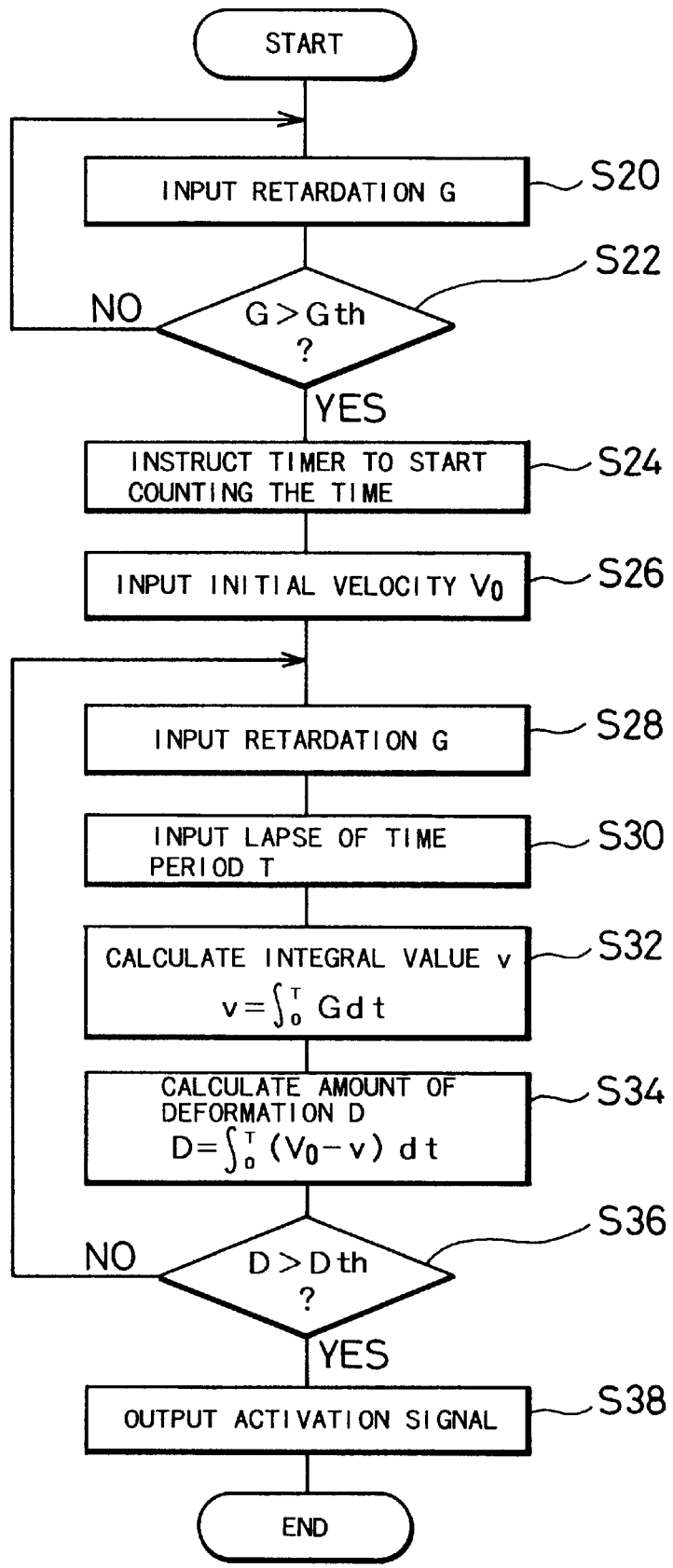
FIG. 2 is a flowchart showing a processing routine executed in the first embodiment by the CPU 40 of the control circuit 30 shown in FIG. 1.

FIG. 2 is a flowchart showing a processing routine executed in the first embodiment by the CPU 40 of the control circuit 30 shown in FIG. 1 when the vehicle crashes. When the program enters the processing routine, the CPU 40 first reads a retardation G at step S20. In accordance with a concrete procedure, the retardation G measured by the retardation sensor 20 is transmitted as an analog electric signal to the analog-to-digital converter 26 via the filter 22 and the amplifier 24. The analog-to-digital converter 26 converts the transmitted analog electric signal to a digital signal and sends the digital signal to the input/output circuit 46 of the control circuit 30. The CPU 40 reads the retardation G input via the input/output circuit 46.

The input retardation G is compared with a preset reference retardation Gth at step S22. When the input retardation G does not exceed the reference retardation Gth at step S22, the program returns to step S20 to receive another input of retardation G. When the input retardation G exceeds the reference retardation Gth, on the contrary, the program proceeds to step S24.

The CPU 40 gives an instruction 'Start counting the time' to the timer 32 at step S24. The timer 32 then starts counting a time period elapsing from a time point when the input retardation G exceeds the reference retardation Gth. The program subsequently proceeds to step S26, at which the CPU 40 reads an initial velocity $V_0$ of the vehicle. In accordance with a concrete procedure, the speed of the vehicle measured by the speed sensor 28 is sent as a digital electric signal to the input/output circuit 46 of the control circuit 30, and the CPU 40 reads the speed input via the input/output circuit 46 and thus obtains the speed of the vehicle at the time point when the input retardation G exceeds the reference retardation Gth, that is, the initial velocity $V_0$ of the vehicle.

The CPU 40 receives data of retardation G from the retardation sensor 20 again at step S28 before reading a lapse of time period T counted by the timer 32 at step S30. The program then proceeds to step S32, at which the CPU 40 calculates an integral value v from the input retardation G and the lapse of time period T according to Equation 1 given below:

$$v = \int_0^T G\,dt \quad (1)$$

The integral value v is obtained by integrating the retardation G with respect to time 't', from the time point at which the retardation G exceeds the reference retardation Gth to the current time point (that is, the time point at which the lapse of time period t is input). The integral value v represents a relative speed of a non-fixed object in the vehicle (for example, a driver or a passenger) to the vehicle at the current time point. When the retardation is applied to the vehicle that moves forward, the non-fixed object in the vehicle is pulled forward by the force of inertia and accelerated forward relative to the vehicle. The integral value v accordingly represents the speed of the non-fixed object in the vehicle relative to the vehicle at the current time point.

At step S34, the CPU 40 then calculates an amount of deformation D of the vehicle from the input lapse of time period T, the initial velocity $V_0$ of the vehicle, and the integral value v obtained at step S32 according to Equation 2 given below:

$$D = \int_0^T (V_0 - v)\,dt \quad (2)$$

As discussed above, when the retardation is applied to the vehicle, the non-fixed object in the vehicle is accelerated forward relative to the vehicle and the integral value v shows the relative speed of the non-fixed object to the vehicle at the current time point. The ground speed of the non-fixed object in the vehicle at the current time point has, however, not been changed from but is kept identical with the speed of the vehicle at the time point when the retardation is applied to the vehicle. It is assumed that the time point at which the retardation G exceeds the reference retardation Gth is identical with the time point at which the retardation is applied to the vehicle. Upon this assumption, the ground speed of the non-fixed object in the vehicle at the current time point is equal to the initial velocity $V_0$ defined above. In the right side of Equation 2, the term ($V_0-v$) shows the difference between the ground speed $V_0$ of the non-fixed object in the vehicle at the current time point and the relative speed v of the non-fixed object to the vehicle at the current time point, thereby representing the ground speed of the vehicle at the current time point.

Equation 2 integrates the ground speed ($V_0-v$) of the vehicle with respect to time 't', from the time point at which the retardation G exceeds the reference retardation Gth to the current time point. It is assumed that the vehicle crashes into a collision object at the time point when the retardation G exceeds the reference retardation Gth. Upon this assumption, the value D obtained by Equation 2 represents the amount of displacement of the vehicle after the time point when the vehicle crashes into the collision object (that is, the amount of displacement of the vehicle when the position of the retardation sensor 20 in the vehicle is assumed to be a reference point). After crashing into the collision object, the vehicle moves forward while making the front part of the vehicle deformed due to the collision with the collision object. The amount of displacement of the vehicle (that is, the distance by which the vehicle moves forward) is thus equivalent to the amount of deformation of the vehicle (for example, the dented length of the front part of the vehicle). The value D obtained by Equation 2 accordingly represents the amount of deformation of the vehicle at the current time point.

It is assumed that the vehicle crashes into the collision object at the time point when the retardation G exceeds the reference retardation Gth as discussed above. Upon this assumption, the initial velocity $V_0$ of the vehicle represents the speed of the vehicle at the time point when the vehicle crashes into the collision object, that is, the collision speed of the vehicle.

The operation unit 41 of the CPU 40 primarily executes the processing discussed above, whereas the activation unit 43 of the CPU 40 mainly carries out the processing discussed below.

Referring back to the flowchart of FIG. 2, the CPU 40 compares the amount of deformation D of the vehicle thus obtained with a specified threshold value Dth at step S36. When the amount of deformation D does not exceed the specified threshold value Dth, the program returns to step S28 to read another input of retardation G and repeat the processing discussed above. When the amount of deformation D exceeds the specified threshold value Dth, on the other hand, the program proceeds to step S38 at which the CPU 40 outputs an activation signal to the driving circuit 34 via the input/output circuit 46. In response to the activation signal, the driving circuit 34 supplies electricity to the squib 38 and ignites a gas-generating agent (not shown) with the squib 38 to activate the air bag unit 36.

FIGS. 3(a) through 3(d) are characteristic charts showing the retardation G input into the CPU 40 as well as the integral value v, the difference $V_0-v$, and the amount of deformation D computed by the CPU 40, which are all plotted against the time. FIGS. 3(a), 3(b), 3(c), and 3(d) respectively represent variations in retardation G, integral value v, difference $V_0-v$, and amount of deformation D against the time.

Figure 3A:
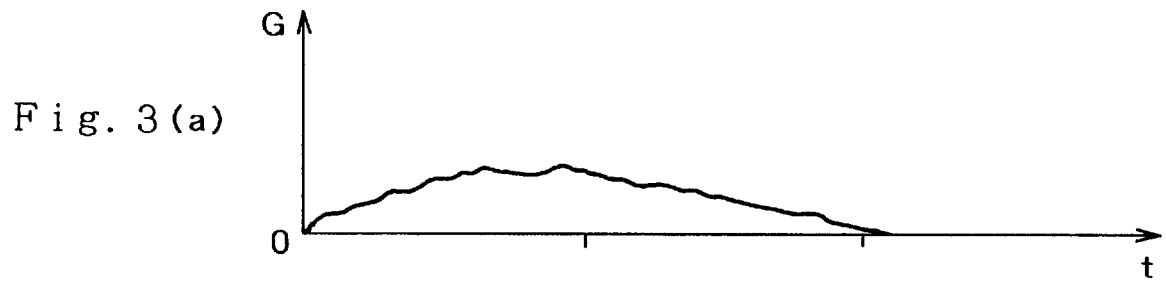
FIGS. 3(a) through 3(d) are characteristic charts showing the retardation G input into the CPU 40 as well as the integral value v, the difference $V_0-v$, and the amount of deformation D computed by the CPU 40, which are all plotted against the time.
Figure 3B:
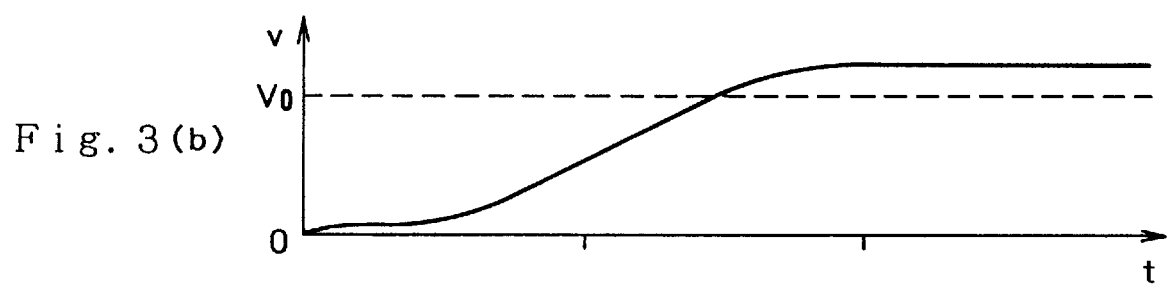
Figure 3C:
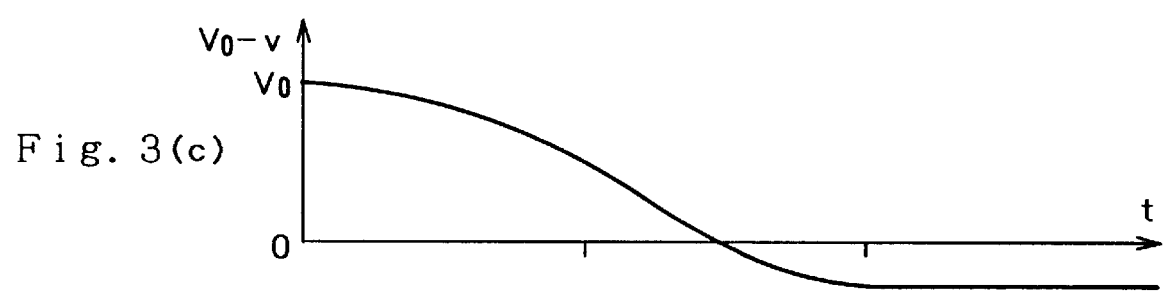

It is assumed that the reference retardation Gth is set equal to zero when the retardation G of the vehicle varies as shown in FIG. 3(a). The retardation G then exceeds the reference retardation Gth at a time point t=0. The integral value v of the retardation G is accordingly varied as shown in FIG. 3(b). When it is assumed that $V_0$ represents the initial velocity of the vehicle at the time point t=0 (that is, the time point at which the retardation G exceeds the reference retardation Gth), the difference $V_0-v$ between the initial velocity $V_0$ of the vehicle and the integral value v varies as shown in FIG. 3(c). The difference $V_0-v$ gradually decreases to take a negative value at a specific time point when the integral v exceeds the initial velocity $V_0$ in the graph of FIG. 3(c). Since the difference $V_0-v$ represents the ground speed of the vehicle as discussed above, the graph of FIG. 3(c) shows that the ground speed of the vehicle becomes negative at the specific time point. The ground speed of the vehicle changes to negative since the vehicle crashing into the collision object moves backward by the reaction of collision.

Figure 3D:
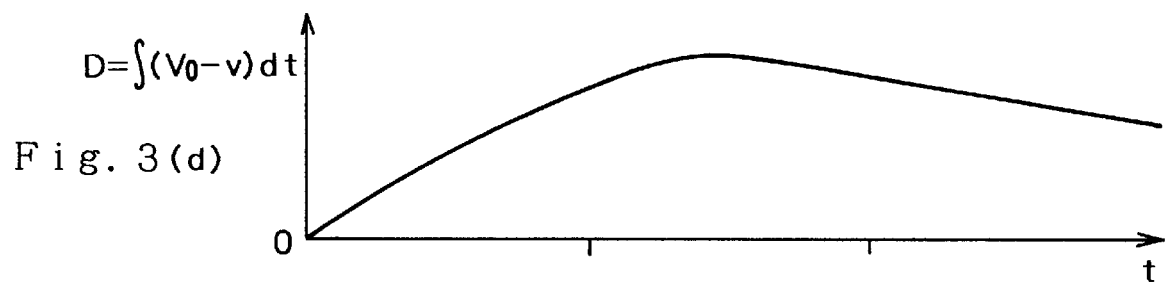
Figure 10A:
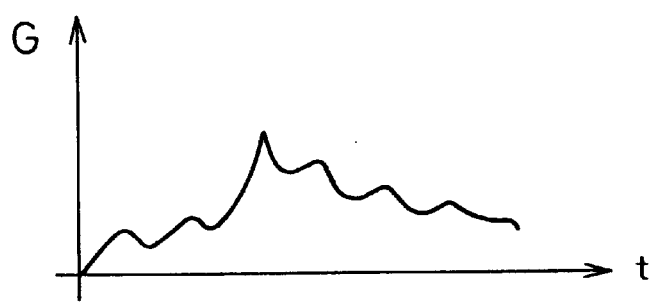
FIGS. 10(a) through 10(c) are characteristic charts showing time-based variations in retardation G measured by a G sensor as well as in integral value v and second integral value S of the retardation G upon collision of a vehicle.
Figure 10B:
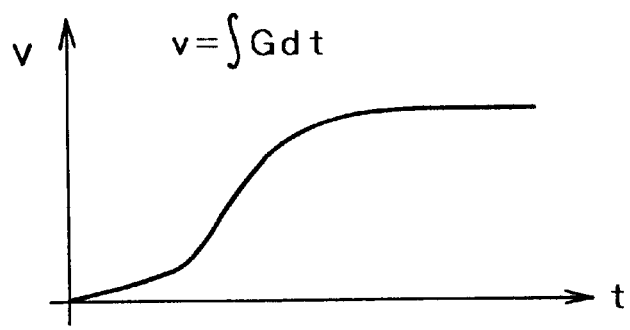
Figure 10C:
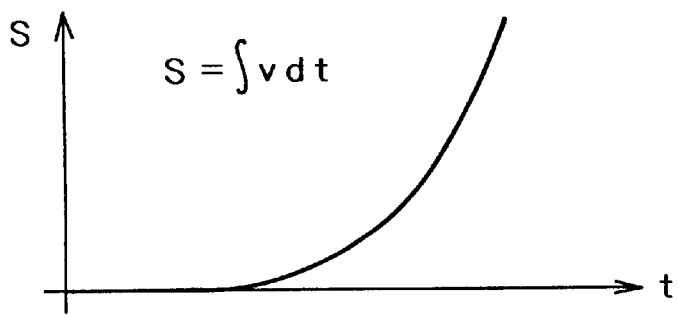
Figure 11A:
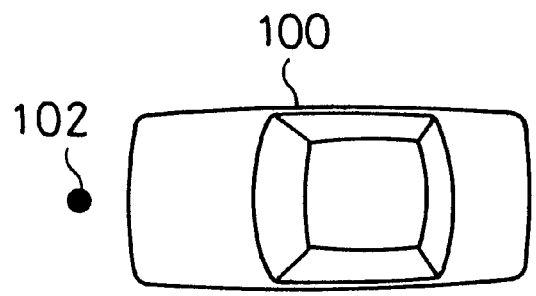
FIGS. 11(a) through 11(c) illustrate the concept of a pole crash and an under-ride collision of a vehicle as well as a time-based variation in retardation G of the vehicle upon collision of the vehicle.
Figure 11B:
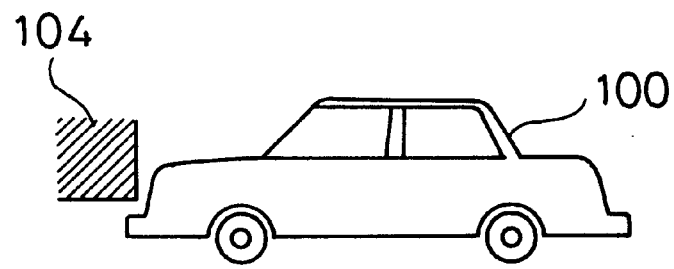
Figure 11C:
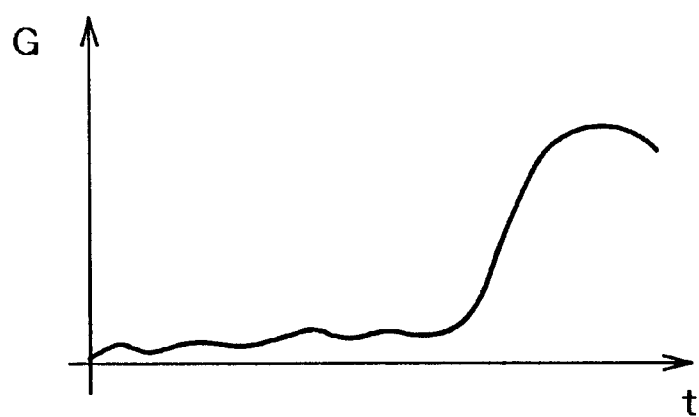

The amount of deformation D of the vehicle, which is obtained by integrating the difference ($V_0-v$) with respect to time, varies as shown in FIG. 3(d). As clearly seen in FIG. 3(d), the amount of deformation D of the vehicle does not increase infinitely but is limited to be not greater than a specified value, unlike the second integral value S of the retardation G shown in FIG. 10(c). The structure of the embodiment can accordingly determine whether the air bag unit 36 is to be activated or not (that is, whether the gas-generating agent is to be ignited with the squib 38 or not) using only the amount of deformation D, and does not require another operation value for the determination, which the conventional structure requires. Even when a relatively soft part of the vehicle crashes into the collision object, the vehicle is remarkably deformed, so that the characteristic curve of the amount of deformation D of the vehicle against the time rises immediately. In the structure of the embodiment, an appropriate threshold value Dth is set to be compared with the amount of deformation D. This enables the amount of deformation D to quickly rise and exceed the threshold value Dth in an early stage when the vehicle crashes into a pole or in an under-ride collision, thereby effectively determining the ignition timing of the squib 38. The structure of the embodiment uses the amount of deformation D of the vehicle in order to control activation of the air bag unit 36 according to the damage of the body which the vehicle sustains upon collision.

In the embodiment, the speed sensor 28 measures the ground speed of the vehicle as discussed previously. The initial velocity $V_0$ read by the CPU 40 at step S26 in the flowchart of FIG. 2 namely represents the ground speed of the vehicle at the time point when the retardation G exceeds the reference retardation Gth. The amount of deformation D of the vehicle computed at step S34 thereby represents the value when the vehicle crashes into a still collision object at the ground speed $V_0$. The vehicle may, however, crash into moving objects, such as another vehicle running on the road, as well as still objects, such as a utility pole or a guardrail.

In another example, not the speed sensor for measuring the ground speed of the vehicle but another speed sensor for measuring the speed of the own vehicle relative to another running vehicle (a moving collision object) may be used for the speed sensor 28. The CPU 40 then reads the relative speed of the own vehicle to another vehicle at the time point when the retardation G exceeds the reference retardation Gth, as the initial velocity $V_0$ of the vehicle, at step S26 in the flowchart of FIG. 2. The amount of deformation D of the vehicle computed at step S34 thus represents the amount of deformation of the own vehicle when the own vehicle collides with another vehicle (vehicle of collision object) at the relative speed $V_0$.

In accordance with a concrete procedure, when the retardation is applied to the own vehicle, the non-fixed object in the own vehicle is accelerated forward relative to the own vehicle as discussed above. The integral value v obtained at step S32 accordingly shows the speed of the non-fixed object in the own vehicle relative to the own vehicle at the current time point. The relative speed of the non-fixed object in the own vehicle to the vehicle of collision object at the current time point has, however, not been changed from but is kept identical with the relative speed of the own vehicle to the vehicle of collision object at the time point when the retardation is applied to the own vehicle. It is assumed that the time point at which the retardation G exceeds the reference retardation Gth is equal to the time point at which the retardation is applied to the own vehicle. Upon this assumption, the relative speed of the non-fixed object in the own vehicle to the vehicle of collision object at the current time point is equal to the initial velocity $V_0$ described previously. The term ($V_0-v$) in Equation 2 is defined as the difference between the relative speed $V_o$ of the non-fixed object in the own vehicle to the vehicle of collision object at the current time point and the relative speed v of the non-fixed object in the own vehicle to the own vehicle at the current time point, thereby representing the relative speed of the own vehicle to the vehicle of collision object at the current time point.

Equation 2 integrates the relative speed ($V_0-v$) of the own vehicle to the vehicle of collision object with respect to time 't', from the time point at which the retardation G exceeds the reference retardation Gth to the current time point. It is assumed that the own vehicle collides against the vehicle of collision object at the time point when the retardation G exceeds the reference retardation Gth. Upon this assumption, the value D obtained by Equation 2 represents the amount of displacement of the own vehicle relative to the vehicle of collision object after the time point when the own vehicle collides against the vehicle of collision object. After colliding with the vehicle of collision object, the own vehicle moves toward the vehicle of collision object while making the front part of the own vehicle deformed due to the collision with the vehicle of collision object. The amount of displacement of the own vehicle to the vehicle of collision object (that is, the relative distance by which the own vehicle moves toward the vehicle of collision object ) is thus equivalent to the amount of deformation of the own vehicle. The value D obtained by Equation 2 accordingly represents the amount of deformation of the own vehicle at the current time point.

When the speed sensor for measuring the speed of the own vehicle relative to the vehicle of collision object is used as the speed sensor 28 in place of the speed sensor for measuring the ground speed of the vehicle, the activation control apparatus 50 can appropriately compute the amount of deformation of the own vehicle which collides against the vehicle of collision object, that is, another running vehicle, thereby controlling activation of the air bag unit 36 at a suitable timing.

Applicable examples of the speed sensor for measuring the speed of the own vehicle relative to the vehicle of collision object include radar sensors, ultrasonic sensors, and infrared sensors.

Figure 4:
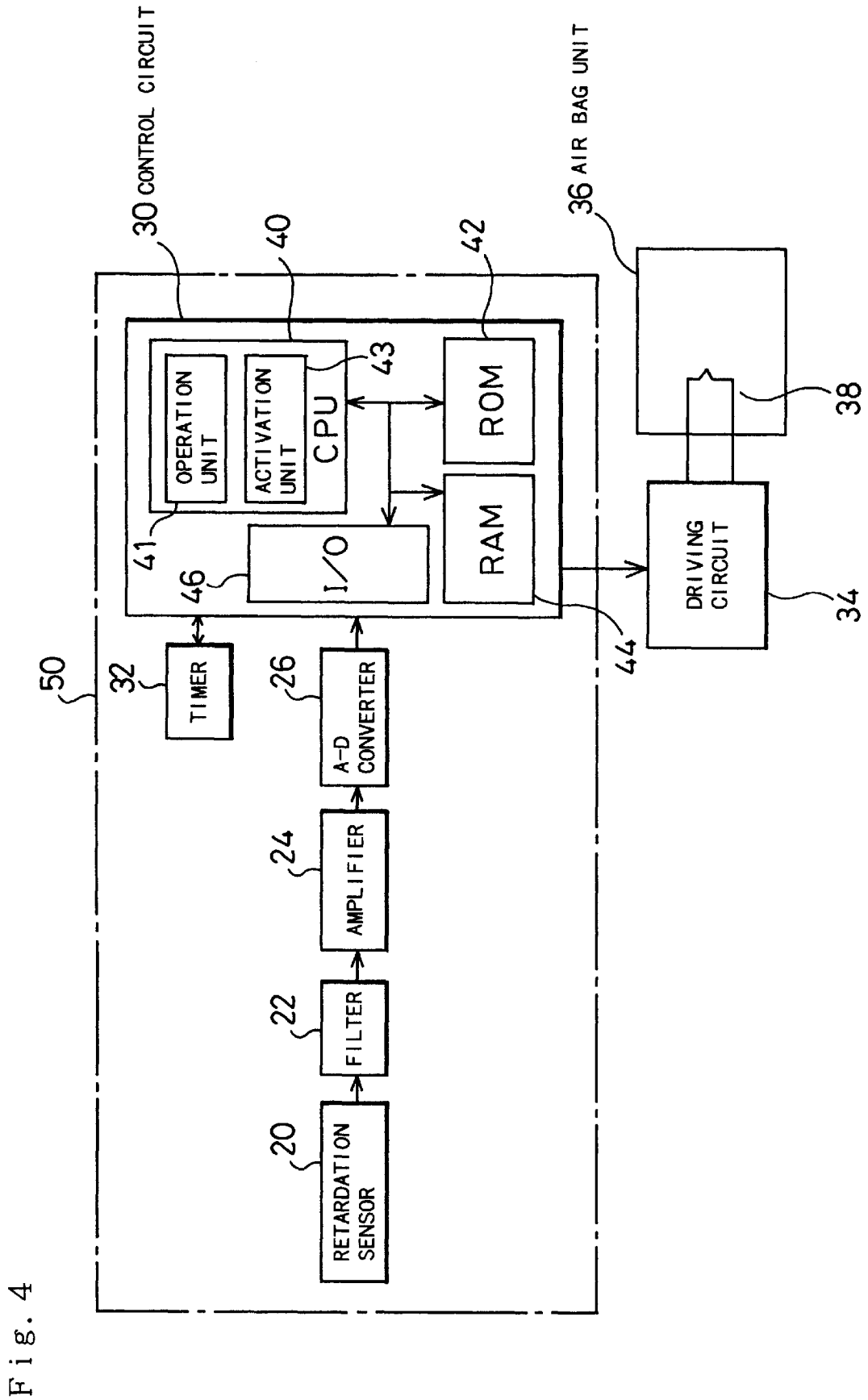
FIG. 4 is a block diagram illustrating structure of another activation control apparatus 60 as a second embodiment according to the present invention.

FIG. 4 is a block diagram illustrating structure of another activation control apparatus 60 as a second embodiment according to the present invention. Referring to FIG. 4, the activation control apparatus 60 of the second embodiment does not include a speed sensor, which the activation control apparatus 50 of the first embodiment includes. The structure of the second embodiment accordingly determines the amount of deformation of the vehicle using only the retardation G measured by the retardation sensor 20. In accordance with a concrete procedure, the amount of deformation of the vehicle is calculated from the integral value v at the current time point, instead of from the initial velocity $V_0$ of the vehicle at the time point when the retardation G exceeds the reference retardation Gth.

Figure 5:
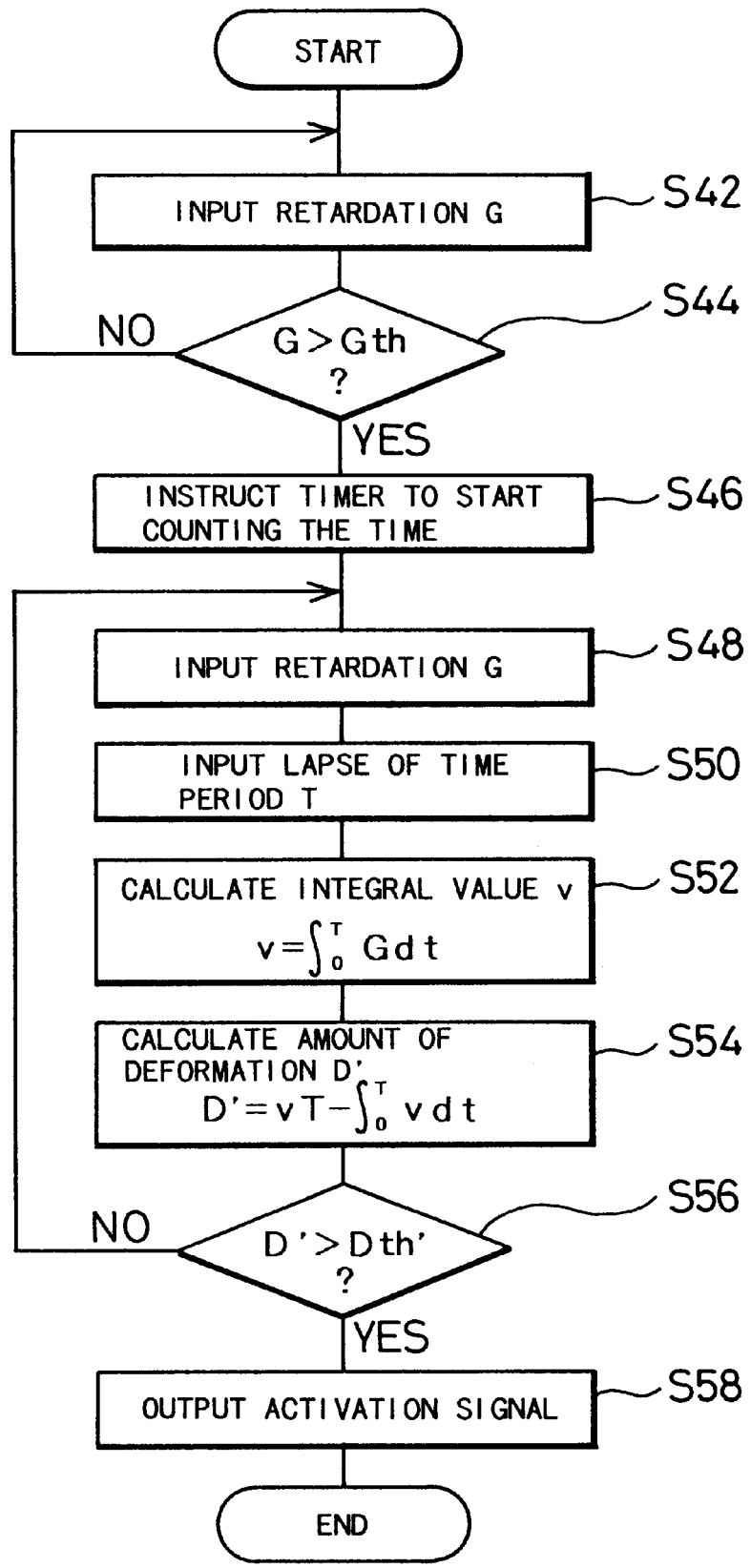
FIG. 5 is a flowchart showing a processing routine executed in the second embodiment by the CPU 40 of the control circuit 30 shown in FIG. 4.

FIG. 5 is a flowchart showing a processing routine executed in the second embodiment by the CPU 40 of the control circuit 30 shown in FIG. 4 when the vehicle crashes. The processing of steps S42 through S52 in the flowchart of FIG. 5 is identical with that of steps S20 through S32 in the flowchart of FIG. 2, except that the second embodiment does not have the step corresponding to step S26 of the first embodiment at which the CPU 40 reads the initial velocity $V_0$ of the vehicle.

At step S54, the CPU 40 calculates an amount of deformation D' of the vehicle from the lapse of time period T read at step S50 and the integral value v obtained at step S52 according to Equation 3 given below:

$$D' = vT - \int_0^T v\,dt \quad (3)$$

Since the initial velocity $V_0$ of the vehicle at the time point when the retardation G exceeds the reference retardation Gth in Equation 2 is a constant, Equation 2 can be rewritten as:

$$D = v_0 T - \int_0^T v\,dt \quad (4)$$

Comparison between Equation 4 and Equation 3 shows that the processing of the second embodiment utilizes the integral value v in place of the initial velocity $V_0$ of the vehicle. Whereas the value D obtained by Equation 2 represents the amount of deformation of the vehicle at the current time point when the vehicle crashes into the collision object at the initial velocity $V_0$, the value D' obtained by Equation 3 represents the amount of deformation of the vehicle at the current time point when it is assumed that the vehicle crashes into the collision object at the speed v.

Referring back to the flowchart of FIG. 5, at step S56, the CPU 40 compares the amount of deformation D' of the vehicle thus obtained with a specified threshold value Dth'. When the amount of deformation D' does not exceed the threshold value Dth', the program returns to step S48 to receive another input of retardation G and repeat the processing. When the amount of deformation D' exceeds the threshold value Dth', on the other hand, the program proceeds to step S58 at which the CPU 40 outputs an activation signal to the driving circuit 34. An appropriate value is previously set to the threshold value Dth' according to the amount of deformation D' obtained by Equation 3.

Figure 6A:
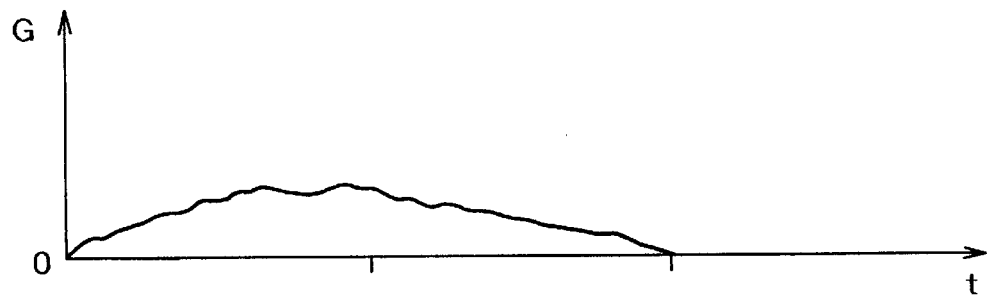
FIGS. 6(a) through 6(c) are characteristic charts showing the retardation G input into the CPU 40 and the integral value v computed by the CPU 40, which are plotted against the time.
Figure 6B:
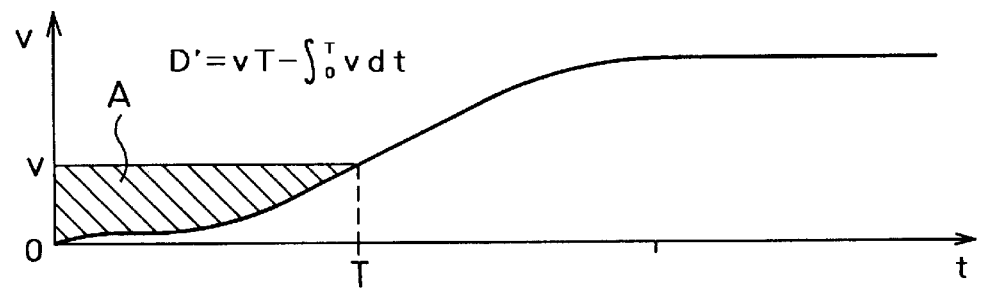
Figure 6C:
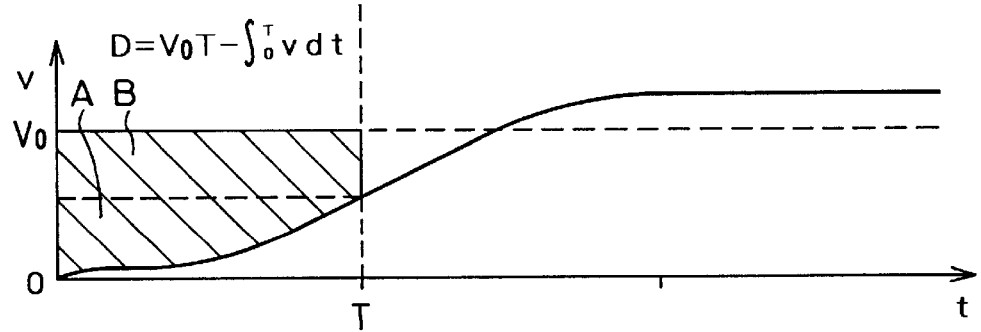

FIGS. 6(a) through 6(c) are characteristic charts showing the retardation G input into the CPU 40 and the integral value v computed by the CPU 40, which are plotted against. the time. FIG. 6(a) shows a variation in retardation G against the time, whereas FIGS. 6(b) and 6(c) show a variation in integral value v against the time, with the comparison between the amount of deformation D' of the vehicle obtained in the second embodiment and the amount of deformation D of the vehicle obtained in the first embodiment.

With a variation in retardation G as shown in FIG. 6(a), the integral value v of the retardation G varies as shown in FIGS. 6(b) and 6(c). The amount of deformation D' of the vehicle obtained by Equation 3 is defined as an area of a region A filled with slant lines in FIG. 6(b), whereas the amount of deformation D of the vehicle obtained in the first embodiment (that is, obtained by Equation 4) is defined as an area of regions A+B filled with slant lines in FIG. 6(c). This means that the amount of deformation D' obtained in the second embodiment is smaller than the amount of deformation D obtained in the first embodiment by the area of the region B.

Like the amount of deformation D of the vehicle in the first embodiment, the amount of deformation D' of the vehicle in the second embodiment does not increase infinitely but is limited to be not greater than a specified value. The structure of the second embodiment can accordingly determine whether the air bag unit 36 is to be activated or not (that is, whether the gas-generating agent is to be ignited with the squib 38 or not) using only the amount of deformation D', and does not require another operation value for the determination, which the conventional structure requires. Even when a relatively soft part of the vehicle crashes into the collision object, the characteristic curve of the amount of deformation D' of the vehicle against the time rises immediately. In the structure of the second embodiment, an appropriate threshold value Dth' is set to be compared with the amount of deformation D'. This enables the amount of deformation D' to quickly rise and exceed the threshold value Dth' in an early stage when the vehicle crashes into a pole or in an under-ride collision, thereby effectively determining the ignition timing of the squib 38. The structure of the second embodiment uses the amount of deformation D' of the vehicle in order to control activation of the air bag unit 36 according to the damage of the body which the vehicle sustains upon collision. The second embodiment does not use the initial velocity $V_0$ of the vehicle to calculate the amount of deformation D', thereby not requiring the speed sensor 28. No inputs from the speed sensor 28 can effectively reduce the required number of input terminals of the control circuit 30.

FIGS. 7(a) and 7(b) are characteristic charts showing the integral value v and the amount of deformation D' of the vehicle, which are plotted against the time, when the vehicle crashes into a pole or in an under-ride collision. FIG. 7(a)

represents the time-based variation in integral value v and FIG. 7(b) the time-based variation in amount of deformation D'. In FIGS. 7(a) and 7(b), the solid lines P1 and P2 represent the characteristic curves when the vehicle crashes into a pole (in a pole crash), the solid lines A1 and A2 characteristic curves in an under-ride collision, and the broken lines F1 and F2 characteristic curves when the vehicle collides in a frontal crash at a low speed.

Figure 7:
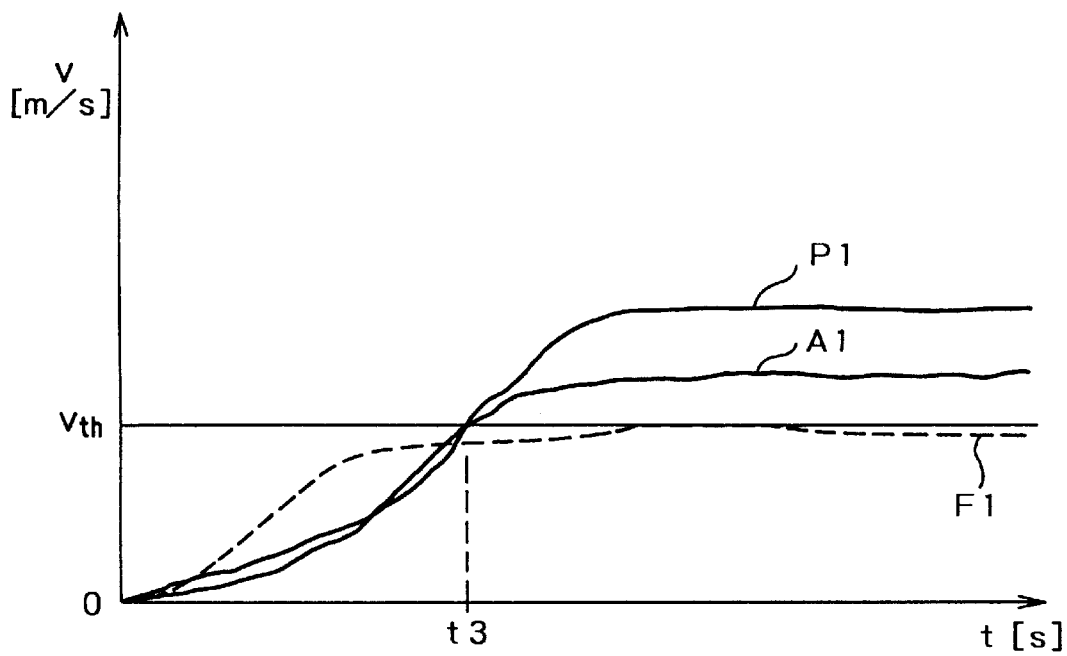
FIGS. 7(a) and 7(b) are characteristic charts showing the time-based variations in integral value v and amount of deformation D' of the vehicle when the vehicle crashes into a pole or in an under-ride collision.
Figure 7:
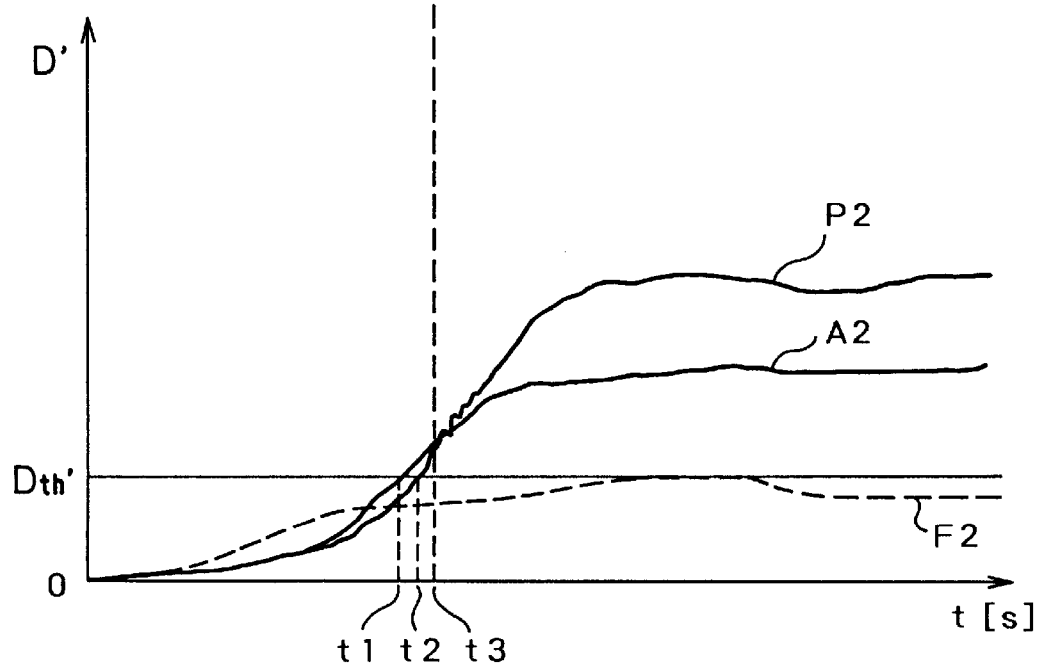

In the graphs of FIG. 7, the maximum values of the respective characteristic curves F1 and F2 when the vehicle collides in a frontal crash at a low speed are specified as threshold values. While the maximum value of the characteristic curve F1 in FIG. 7(a) is set as a threshold value vth with respect to the integral value v, the maximum value of the characteristic curve F2 in FIG. 7(b) is set as a threshold value Dth' with respect to the amount of deformation D'.

In the conventional method using the integral value v obtained by integrating the retardation G once, the integral value v exceeds the threshold value vth at a time point t3 both in the pole crash (P1) and in the under-ride collision (A1) as shown in FIG. 7(a). In the method of this embodiment using the amount of deformation D' of the vehicle, on the other hand, the amount of deformation D' exceeds the threshold value Dth' at a time point t2 in the pole crash (P2) and at a time point t1 in the under-ride collision (A2) as shown in FIG. 7(b). Namely the amount of deformation D' exceeds the threshold value Dth' at the respective time points t2 and t1, which are both earlier than the time point t3, in the pole crash (P2) and in the under-ride collision (A2). Compared with the conventional method using the integral value v, the method of the embodiment using the amount of deformation D' of the vehicle can ignite the gas-generating agent with the squib at a quicker timing, thereby enabling the air bag unit 36 to be activated more quickly both in the pole crash and in the under-ride collision.

The following describes a third embodiment according to the present invention. The structure of the activation control apparatus 60 of the third embodiment is identical with that of the second embodiment shown in FIG. 4. As discussed above, the amount of deformation D' obtained in the second embodiment is smaller than the amount of deformation D obtained in the first embodiment by the area of the region B shown in FIG. 6(c). This may result in making a rise in the time-based characteristic curve of the amount of deformation D' used in the second embodiment behind a rise in the time-based characteristic curve of the amount of deformation D used in the first embodiment. The structure of the third embodiment accordingly calculates an amount of deformation D", which is approximate to the amount of deformation D, from the integral value v and the amount of deformation D', in order to attain a characteristic curve similar to that of the amount of deformation D used in the first embodiment.

Figure 8:
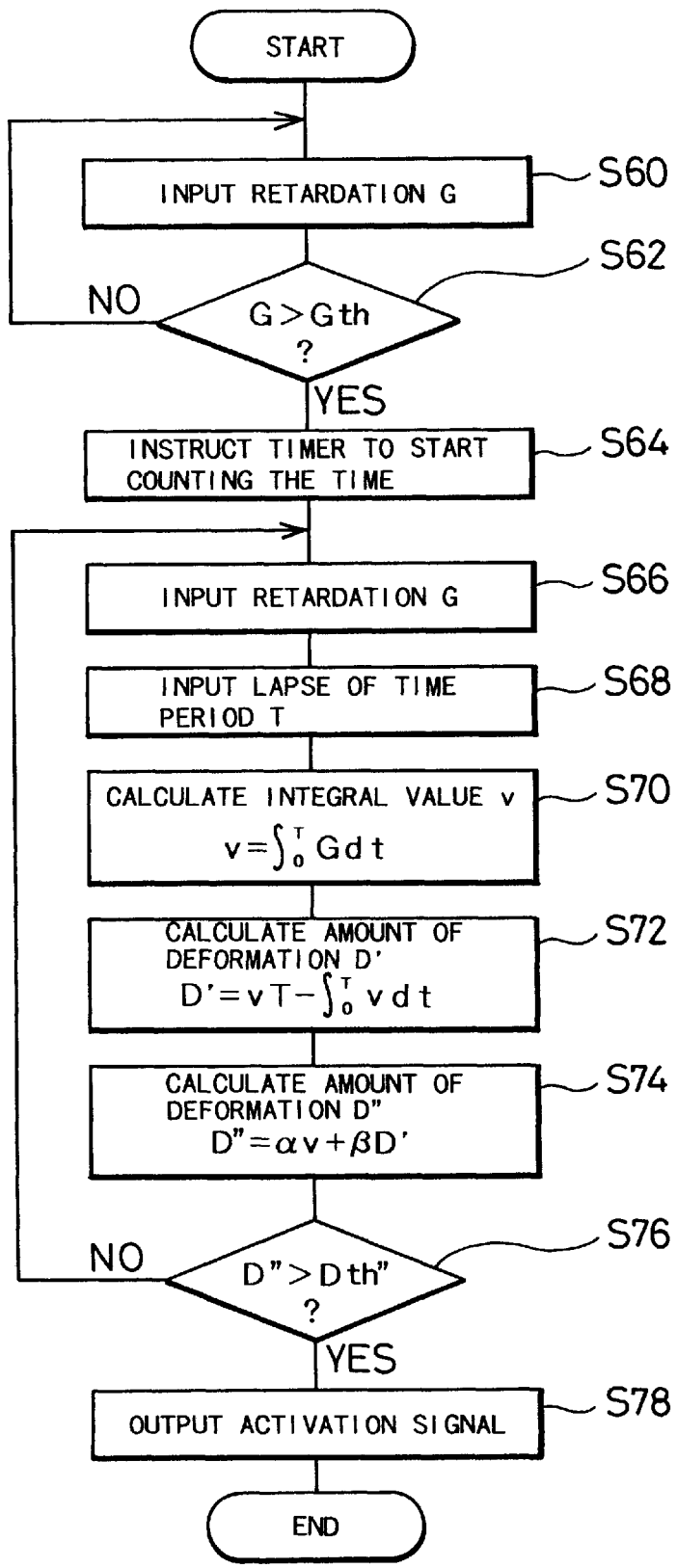
FIG. 8 is a flowchart showing a processing routine executed in the third embodiment by the CPU 40 of the control circuit 30.

FIG. 8 is a flowchart showing a processing routine executed in the third embodiment by the CPU 40 of the control circuit 30 when the vehicle crashes. The processing of steps S60 through S72 in the flowchart of FIG. 8 is identical with that of steps S42 through S54 in the flowchart of FIG. 5.

At step S74, the CPU 40 calculates an amount of deformation D" of the vehicle from the integral value v obtained at step S70 and the amount of deformation D' obtained at step S72 according to Equation 5 given below:

$$D''=\alpha v+\beta D' \quad (5)$$

wherein α and β denote predetermined coefficients, respectively.

Equation 5 gives a linear weighting function of the integral value v and the amount of deformation D'. In Equation 5, 'v' included in the first term of the right side is the derivative of the amount of deformation D' and corresponds to the gradient of the amount of deformation D', whereas the second term of the right side includes the amount of deformation D' itself. Equation 5 accordingly gives the amount of deformation D" which is approximate to the amount of deformation D used in the first embodiment.

The structure of the third embodiment exerts the same effects as those of the second embodiment and further uses the amount of deformation D" of the vehicle, which is approximate to the amount of deformation D used in the first embodiment. Compared with the time-based characteristic curve of the amount of deformation D' used in the second embodiment, the time-based characteristic curve of the amount of deformation D" has a quicker rise, thereby enabling the passive restraint to be activated at a better timing.

In the third embodiment, the linear weighting function is used to calculate the amount of deformation D", which is approximate to the amount of deformation D, from the amount of deformation D'. A simulation technique utilizing a neural net may be used instead of the linear weighting function.

The above embodiments are only illustrative and not restrictive in any sense. There may be many modifications, changes, and alterations without departing from the spirit and the scope of the main characteristics of the present invention. Some examples of modification are given below.

In the embodiments discussed above, the retardation G of the vehicle is continuously measured by the retardation sensor 20, and the amount of deformation of the vehicle is calculated from the measurement of retardation G. The amount of deformation D of the vehicle obtained in the first embodiment, however, can be calculated from a velocity V of the vehicle, instead of from the retardation G. When $V_0$ in Equation 2 represents the ground speed of the vehicle at the time point when the retardation G exceeds the reference retardation Gth, the term ($V_0-v$) shows the ground speed of the vehicle at the current time point. When $V_0$ represents the relative speed of the own vehicle to the vehicle of collision object at the time point when the retardation G exceeds the reference retardation Gth, on the other hand, the term ($V_0-v$) shows the relative speed of the own vehicle to the vehicle of collision object at the current time point. In any case, the term ($V_0-v$) in Equation 2 shows, in a wide sense, the velocity V of the vehicle at the current time point. If the velocity V of the vehicle at the current time point (that is, either the ground speed of the vehicle at the current time point or the relative speed of the own vehicle to the vehicle of collision object at the current time point) is a known value, the amount of deformation D of the vehicle can be calculated by integrating the velocity V of the vehicle with respect to time 't' as expressed by Equation 6 given below:

$$D = \int_0^T V dt \quad (6)$$

This application can be realized readily by the structure shown in FIG. 1. It is, however, required to use a speed sensor 28 which can continuously measure either the ground speed of the vehicle or the relative speed of the own vehicle to the vehicle of collision object, in order to obtain the velocity V of the vehicle.

Figure 9:
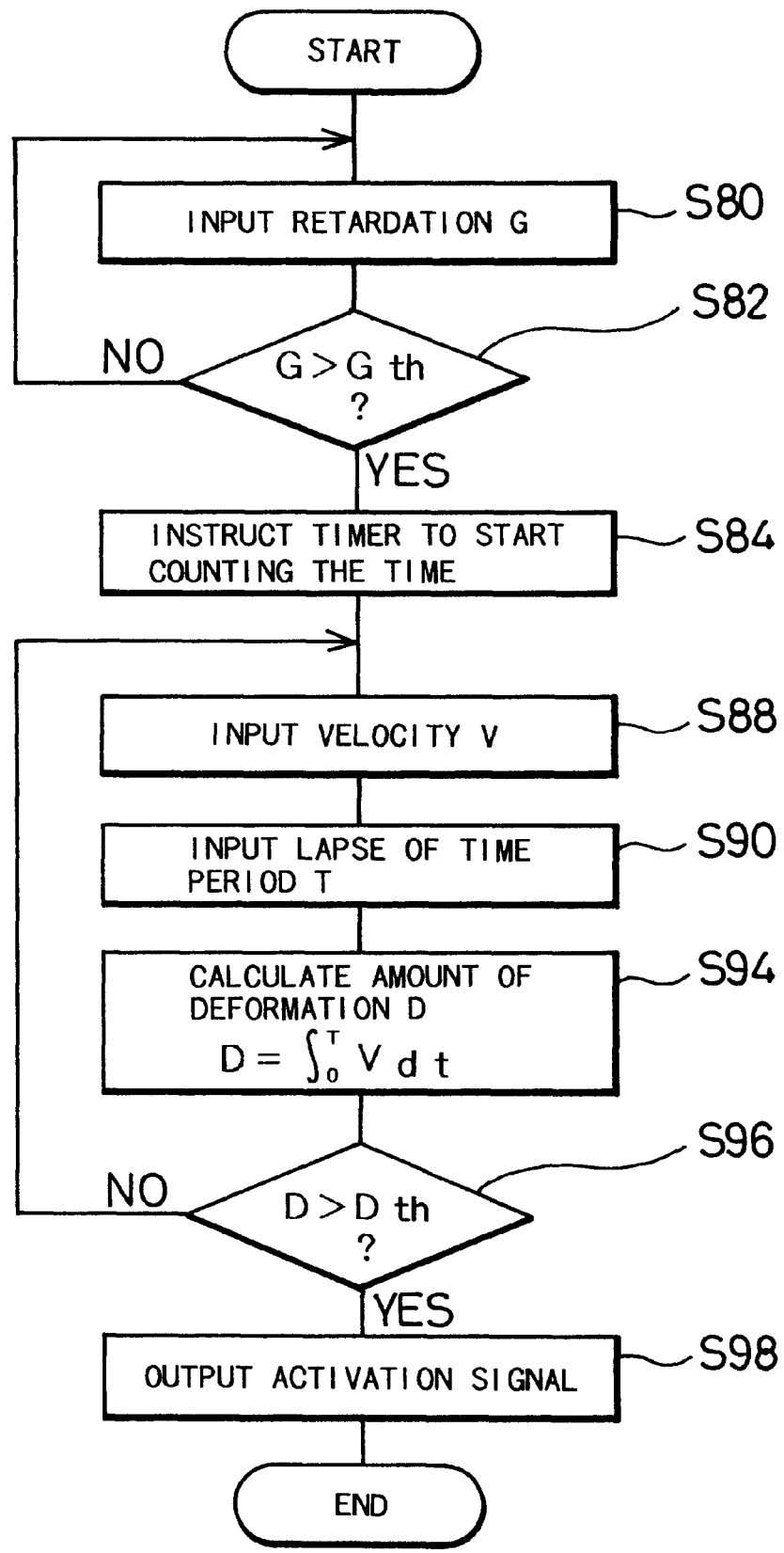
FIG. 9 is a flowchart showing a processing routine executed in the CPU 40 in another application of the present invention.

FIG. 9 is a flowchart showing a processing routine executed by the CPU 40 in this application. The processing of steps S80 through S84 in the flowchart of FIG. 9 is identical with that of steps S20 through S24 in the flowchart of FIG. 2. The processing routine of FIG. 9 does not have the step corresponding to step S26 of the first embodiment at which the CPU 40 reads the initial velocity $V_0$ of the vehicle.

The CPU 40 receives data of velocity V of the vehicle from the speed sensor 28 at step S88 and reads a lapse of time period T from the timer 32 at step S90. The CPU 40 subsequently calculates the amount of deformation D of the vehicle from the input velocity V of the vehicle and the lapse of time period T according to Equation 6 given above at step S94.

After computing the amount of deformation D of the vehicle, the program proceeds to steps S96 and S98, which are identical with steps S36 and S38 in the flowchart of FIG. 2.

The retardation sensor 20 may be excluded from this modified structure since there is no need to continuously measure the retardation G of the vehicle. The structure without the retardation sensor 20 should, however, be provided with a reference retardation sensor, which can at least determine whether the retardation G exceeds the reference retardation Gth. A sensor similar to a safing sensor can be used for the reference retardation sensor.

Although the principle of the present invention is applied to the air bag unit in the above embodiments, it may also be applicable to other passive restraints, such as a seat belt with pre-loader. The seat belt with pre-loader attains the enhanced functions, for example, by making the seat belt surrounded with a gas produced from an inflator.

All the embodiments discussed above relate to the activation control apparatus applicable to the passive restraints. The part for determining the amount of deformation of the vehicle included in the activation control apparatus may be separated from the rest to constitute an apparatus for determining the amount of deformation of the vehicle. The amount of deformation measured by the apparatus of this separate structure can be used for any purposes other than for controlling activation of the passive restraint.

In the structure shown in FIG. 1, the retardation sensor 20, the speed sensor 28, the timer 32, and the operation unit 41 of the CPU 40 correspond to the part for determining the amount of deformation of the vehicle. In the structure shown in FIG. 4, the retardation sensor 20, the timer 32, and the operation unit 41 of the CPU 40 are primary constituents. In the processing routines executed by the CPU 40, the processing up to step S34 in the flowchart of FIG. 2, the processing up to step S54 in the flowchart of FIG. 5, the processing up to step S74 in the flowchart of FIG. 8, and the processing up to step S94 in the flowchart of FIG. 9 are included in the part for determining the amount of deformation of the vehicle.

What is claimed is:

1. An activation control apparatus for controlling activation of a passive restraint mounted on a vehicle when said vehicle crashes into a collision object, said activation control apparatus comprising:
    amount-of-deformation determining means for determining an amount of deformation of said vehicle based on a state of said vehicle which crashes into said collision object said amount-of-deformation determining means comprises:
        retardation measuring means for measuring a retardation of said vehicle; and
        amount-of-deformation calculating means for calculating the amount of deformation from the retardation measured by said retardation measuring means, said amount-of-deformation calculating means comprises:
            initial velocity measuring means for measuring an initial velocity, which represents a speed of said vehicle at a time point when the retardation measured by said retardation measuring means exceeds a specified reference retardation;
            time period measuring means for measuring a lapse of time period after the time point when the retardation exceeds the specified reference retardation; and
            calculating means for calculating the amount of deformation from the lapse of time period, the initial velocity and the retardation measured respectively; and
    activation means for activating said passive restraint when the amount of deformation determined by said amount-of-deformation determining means exceeds a specified threshold value.

2. An activation control apparatus in accordance with claim 1, wherein said calculating means further comprises:
    means for integrating the retardation over the lapse of time period to determine an integral value; and
    means for determining the amount of deformation by integrating a difference between the initial velocity and the integral value over the lapse of time period.

3. An activation control apparatus in accordance with claim 1, wherein said initial velocity measuring means further comprises means for measuring a relative speed of said vehicle to said collision object as the speed of said vehicle.

4. An activation control apparatus for controlling activation of a passive restraint mounted on a vehicle when said vehicle crashes into a collision object, said activation control apparatus comprising:
    amount-of-deformation determining means for determining an amount of deformation of said vehicle based on a state of said vehicle which crashes into said collision object, said amount-of-deformation determining means comprises:
        retardation measuring means for measuring a retardation of said vehicle; and
        amount-of-deformation calculating means for calculating the amount of deformation from the retardation measured by said retardation measuring means, said amount-of-deformation calculating means comprises:
            time period measuring means for measuring a lapse of time period after a time point when the retardation measured by said retardation means exceeds the specified reference retardation; and
            calculating means for calculating the amount of deformation from the lapse of time period and the retardation measured respectively; and
    activation means for activating said passive restraint when the amount of deformation determined by said amount-of-deformation determining means exceeds a specified threshold value.

5. An activation control apparatus in accordance with claim 4, wherein said calculating means further comprises:
    means for integrating the retardation over the lapse of time period to determine an integral value; and
    means for determining the amount of deformation by subtracting a value obtained by integrating the integral value over the lapse of time period from a value obtained by multiplying the integral value by the lapse of time period.

6. An activation control apparatus in accordance with claim 4, wherein said calculating means further comprises:

means for integrating the retardation over the lapse of time period to determine an integral value;

means for calculating a difference between a value obtained by multiplying the integral value by the lapse of time period and a value obtained by integrating the integral value over the lapse of time period;

means for determining the amount of deformation by adding a value obtained by multiplying the integral value by a predetermined first coefficient to a value obtained by multiplying the difference by a predetermined second coefficient.

7. An activation control apparatus for controlling activation of a passive restraint mounted on a vehicle when said vehicle crashes into a collision object, said activation control apparatus comprising:

amount-of-deformation determining means for determining an amount of deformation of said vehicle based on a state of said vehicle, which crashes into said collision object, said amount-of-deformation means comprises;
    speed measuring means for measuring a speed of said vehicle; and
    amount-of-deformation calculating means for calculating the amount of deformation from the speed measured by said speed measuring means; said amount-of-deformation calculating means further comprises:
        detection means for determining whether a retardation of said vehicle exceeds a specified reference retardation;
        time period measuring means for measuring a lapse of time period after a time point when the retardation exceeds the specified reference retardation based on a result determined by said detection means; and
        calculating means for integrating the speed of said vehicle over the lapse of time period to determine the amount of deformation; and activation means for activating said passive restraint when the amount of deformation determined by said amount-of-deformation determining means exceeds a specified threshold value.

8. An activation control apparatus in accordance with claim 7, wherein said speed measuring means measures a relative speed of said vehicle to said collision object as the speed of said vehicle.

* * * * *